United States Patent Office 3,395,081
Patented July 30, 1968

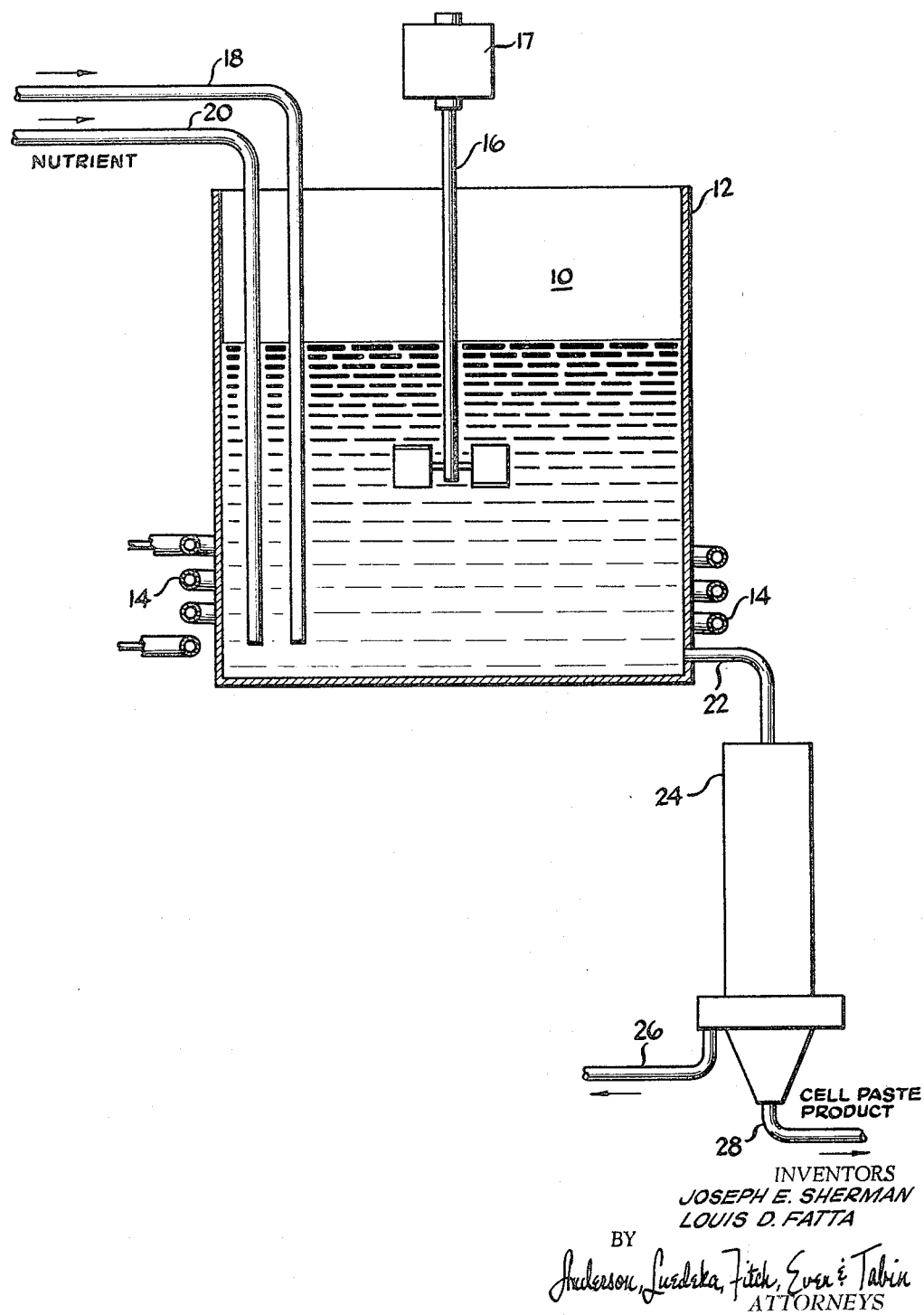

3,395,081
MANUFACTURE OF BACTERIAL CELL PASTE
Joseph E. Sherman, Skokie, and Louis D. Fatta, Westmont, Ill., assignors to National Dairy Products Corporation, New York, N.Y., a corporation of Delaware
Filed July 2, 1965, Ser. No. 469,353
3 Claims. (Cl. 195—96)

ABSTRACT OF THE DISCLOSURE

Preparing a concentrated propionic acid generating bacterial cell paste which is suitable for use in the manufacture of Swiss cheese by inoculating a suitable growth medium with a *Propionibacterium shermanii* culture and propagating the culture in the medium at a pH of about 6.8 to 7.0. The lactos concentration of the medium is maintained above at least about 0.5 percent by weight during growth of the *Propionibacterium shermanii* culture. The bacterial cells are then separated from the medium by centrifugation.

---

This invention generally relates to a method for preparing a bacterial cell paste, and more particularly, it relates to a method for preparing a concentrated propionic acid generating bacterial cell paste.

In many conventional cheesemaking processes a bacterial starter is employed to develop acid and to coagulate the milk, and/or to develop characteristic flavors and properties in cheese. In the manufacture of Swiss or Emmenthaler cheese, a starter is selected which develops carbon dioxide gas during the curing in order to provide the holes which are characteristic of this type of cheese. In a conventional cheese make, the bacterial culture or starter which is added to the milk usually has a relatively dilute concentration of bacterial cells and comprises a considerable proportion of the media in which the bacteria are cultured. Difficulties have been encountered in storing the dilute bacterial culture so that it will have desired visibility when used. Most bacterial cultures must be used within a relatively short period of time, e.g., 1 to 2 days, from the time at which they are made. Moreover, the dilute bacterial cultures are bulky and are difficult to transport and/or store. Accordingly, it has been the practice in cheesemaking to culture the bacteria at or adjacent to the cheesemaking plant, rather than ship the starter culture to the plant from a central location.

The conventional procedure for the preparation of bacterial culture for use in cheesemaking includes the growth of the bacteria in a suitable media, usually skim milk, and the addition of the media and bacteria culture to the milk which is to be made into cheese. Prior procedures for the manufacture of Swiss cheese using a propionic acid generating bacterial starter generally follow the above steps. The propionic acid culture is formed by growing a propionic acid generating bacteria, e.g., *Propionibacterium shermanii*, in a medium to provide a dilute *Propionibacterium shermanii* culture which is then added to milk during the Swiss cheese make.

Now, however, there has been discovered an improved procedure for the culturing of a propionic acid generating bacteria for use in making Swiss cheese. The improved culturing procedure can be satisfactorily carried out on either a batch or continuous basis, preferably on a batch basis. The improved procedure provides a highly concentrated propionic acid generating bacterial cell paste which is substantially separated from the media. The cell paste may be conveniently stored for extended periods of time and can be easily handled and transported at low cost.

Accordingly, it is the principal object of the present invention to provide a method for manufacturing an improved bacterial preparation for use in cheesemaking. It another object to provide an improved method of propagating and concentrating a propionic acid generating bacteria for use in cheesemaking. It is also an object of the invention to provide an improved method of propagating *Propionibacterium shermanii* cell paste for use in the manufacture of Swiss cheese.

Further objects and advantages of the present invention will be apparent from a study of the following detailed description and of the accompanying drawing of which:

The single figure is a schematic flow diagram illustrating a preferred embodiment of preparing a bacterial cell paste in accordance with the present invention.

In general, the present invention includes a method of preparing a concentrated propionic acid generating bacterial cell paste which is suitable for use in the manufacture of Swiss cheese. More specifically, the method comprises inoculating a suitable medium with a *Propionibacterium shermanii* culture and propagating *Propionibacterium shermanii* within the medium at a pH of about 6.8 to 7.0 until an optimum bacterial concentration within the inoculated medium is reached. The lactose concentration within the medium is maintained above at least about 0.5 percent by weight. The bacteria cells are then separated from the medium by centrifuging.

The bacterial cell paste obtained is highly concentrated, and it has 10,000 times as many bacteria per gram as a conventional starter used in a Swiss cheese make. The cell paste can be stored for a relatively long period of time and contains a relatively small amount of water, allowing for ready shipment of the cell paste from a central depot to a cheesemaking plant.

It has been found that it is important that the lactose concentration within the medium should be maintained above at least about 1 percent by weight in order to obtain maximum bacterial growth. The lactose is expended during the bacteria propagation and unless sufficient lactose is present in the medium at all times, maximum propagation will not occur. Further, the lactose concentration of the medium should not be increased above about 1.5 percent if a maximum propagation is to be achieved. Therefore, the lactose concentration should be monitored during the course of the bacteria propagation and additional lactose added when necessary to maintain the lactose concentration in the medium between about 0.5 and 1.5 percent by weight.

Further, in order to obtain maximum bacteria propagation, the pH of the medium should be maintained between about 6.8 to 7.0. It has been found that when the medium is maintained within this pH range substantially greater amounts of cell paste are obtained than when a pH outside of this range is employed. Since the process also produces propionic acid, it is necessary to periodically adjust the pH to within the desired range, preferably by the addition of potassium hydroxide.

Now referring more particularly to the accompanying drawing, the single figure is a schematic flow diagram illustrating a preferred embodiment of the method of preparing a bacterial cell paste according to the present invention. In the figure, a chamber 10 is shown which may comprise an open-topped glass or glass-lined vessel 12 or the like, the contents of which may be heated by heating coils 14. The vessel is provided with agitating means 16. The agitating means 16 may comprise a mechanically operated stirring rod or the like, connected to a motor 17.

The vessel 12 is provided with two inlet lines 18 and 20. Inlet line 18 admits a pH-adjusting solution to the vessel, as, for example, an aqueous potassium hydroxide solution. The other inlet line 20 furnishes a nutrient containing media to the vessel. Any additional lactose that may be added to the vessel during the bacteria propagation may be passed into the vessel through line 20. An outlet line 22 is provided in the sidewall of the vessel. The outlet line 22 is connected to a centrifuge 24 which may be of any suitable design capable of separating solids from liquids. An exit line 26 is provided from the centrifuge for removing the medium therefrom. A separate exit line 28 is also provided from the centrifuge through which the desired product in the form of a cell paste is passed to further treatment, to storage, or to a cheesemaking vat. Alternatively, a continuous centrifuge may be utilized wherein the desired product is continuously removed from the centrifuge.

The system schematically shown in the accompanying figure is adapted to provide a bacterial cell paste product as a result of the generation of bacteria in the vessel. A nutrient containing media may be passed into the vessel as may the pH-adjusting solution. After the bacteria have been propagated, the bacteria-containing media may be passed from the vessel to the centrifuge for separation into a low solids medium and the desired bacterial cell paste.

The system is particularly adapted for the preparation of a cell paste consisting essentially of *Propionibacterium shermanii* or similar propionic acid-producing bacteria for use in Swiss cheese manufacture.

The following is an example of the production of *Propionibacterium shermanii* cell paste on a batch basis by the present method:

Example 1

A bacterial nutrient which includes the constituents set forth in Table I below is prepared:

TABLE I

| Ingredient | Percent of Nutrient by Weight | Grams |
| --- | --- | --- |
| Soy Peptone | 0.3 | 1,710 |
| Yeast Extract | 0.4 | 2,280 |
| Enzyme Hydrolyzed Milk Proteins | 0.5 | 2,850 |
| Sodium Chloride | 0.2 | 1,140 |
| Mono Potassium Phosphate | 0.1 | 567.75 |
| Diammonium Phosphate | 0.2 | 1,140 |
| Magnesium Sulfate | 0.02 | 114 |
| Manganese Sulfate | 0.005 | 28.5 |
| Ferrous Sulfate | 0.001 | 5.7 |
| Potassium Citrate | 0.2 | 1,140 |
| Sodium Acetate | 0.5 | 2,850 |
| Agar | 0.033 | 188 |
| Lactose | 1.5 | 8,550 |
| Water | to make up 150 gal. | |

The pH of the solution set forth in the Table I is adjusted to about 6.8 with a sterile aqueous potassium hydroxide solution, and the solution is sterilized for one-half hour at 250 degrees F.

A stock culture of *Propionibacterium shermanii* is prepared by inoculating a nutrient as set forth in Table I with 200 ml. of a 48 hour culture of *Propionibacterium shermanii* per 15 liters of nutrient. The stock culture is incubated at 86 degrees F. for 72 hours.

150 gallons of the sterilized nutrient as set forth in Table I is placed in a reaction vessel and is inoculated with 27 liters of the stock culture. The inoculated medium is held at 86 degrees F. in the vessel for about 72 hours, with the pH being adjusted after about 24 hours with a 20 percent aqueous potassium hydroxide solution to maintain the inoculated medium at a pH within the range of 6.8 to 7.0. The pH is thereafter adjusted to 6.8 to 7.0 every 12 hours until the fermentation is completed.

The lactose concentration of the inoculated medium is measured after 24 hours and every 4 hours thereafter. Lactose is added to the inoculated medium in order to maintain the lactose concentration in the inoculated medium between about 0.5 percent and about 1.5 percent, by weight.

At the end of about 72 hours, the propagation of the *Propionibacterium shermanii* is completed and an optimum bacterial concentration is obtained. The medium containing bacteria is then passed to a centrifuge where the propionic acid generating bacteria is separated from the nutrient in the form of a cell paste. 21 pounds of cell paste is obtained from the centrifuge which contains $51 \times 10^{10}$ bacteria per gram. The cell paste has a moisture content of about 80 percent, by weight, and a bacteria population which is about 10,000 times as great as the bacteria population in a conventional bacterial starter.

The cell paste is stored as obtained from the centrifuge at about 35 degrees F. for about 4 months. At the end of the storage the cell paste has not lost any appreciable viability. Another sample of the cell paste is stored at room temperature (about 70 degrees F.), and retains adequate viability for a week or more.

The cell paste can be further concentrated by lyophilizing (freeze drying), producing a product having increased storage stability.

Example 2

*Propionibacterium shermanii* cell paste, similar to that produced by the method of Example 1, is formulated on a continuous basis utilizing the apparatus as shown in the drawing. *Propionibacterium shermanii* and a nutrient are continuously fed into a vessel. The pH of the medium in the vessel is maintained between about 6.8 to 7.0 by the addition of aqueous potassium hydroxide to the vessel and the lactose concentration is maintained between about 0.5 percent and 1.5 percent by weight. A continuous amount of the bacteria containing medium is continuously passed from the vessel to a continuous centrifuge where the cell paste is separated from the nutrient.

The volume of nutrient passed into the vessel and the rate of withdrawal of the propagated medium from the vessel are controlled so that maximum propagation of the *Propionibacterium shermanii* is assured. The average residence time for the bacteria within the vessel is from about 20 to about 30 minutes. Since the bacteria is maintained at optimum concentrations and under optimum growth conditions throughout the residence time in the growth chamber there is optimum propagation of the bacteria and optimum yields of *Propionibacterium shermanii* bacteria per unit of time are obtained.

Example 3

The *Propionibacterium shermanii* cell paste, obtained rom Example 1, is employed as a starter in a conventional Swiss cheese make. The cell paste is incorporated into the milk in place of a conventional *Propionibacterium shermanii* bacterial culture. The remaining steps of the Swiss cheese make are then carried out in the conventional manner.

In this connection, two grams of *Propionibacterium shermanii* cell paste is added to approximately 200 milliliters of milk, and is blended therewith in a high-speed blender. The resultant blend, comprising two grams of cell paste in suspension is then added to 20,000 pounds of whole milk contained in a conventional Swiss cheese vat.

Following the addition of the foregoing blend to the milk, the normal methods of Swiss cheese manufacture and cure are employed.

The resultant Swiss cheese is a high-quality product, which is superior in various respects to Swiss cheese heretofore known.

The Swiss cheese produced in accordance with the present invention utilizing the cell paste of the present invention is of uniformly high grade, color, texture, pH, moisture, appearance, and taste and in all respects the cell paste performs in a satisfactory manner.

The preceding examples clearly illustrate a method of preparing an improved *Propionibacterium shermanii* bacterial cell paste useful in the manufacture of Swiss cheese. The paste can be prepared rapidly, efficiently and inexpensively. The cell paste produced by the method of the present invention has an extremely high population of bacteria and can be lyophilized or stored in its cell paste form for long periods of time without a substantial reduction in viability. The cell paste will reduce overall costs of transportation and storage of bacteria cultures for cheesemaking. Because of the uniformity of the cell paste of the present invention, a pre-selected amount of paste may be added in any particular Swiss cheesemaking vat with the assurance that substantially all of the bacteria in the cell paste are of the desired species. This uniformity of activity and of purity provides a basis for the production of consistently high quality Swiss cheese.

Various of the features of the present invention are set forth in the following claims.

What is claimed is:

1. The method of preparing a concentrated bacteria containing cell paste comprising, inoculating a bacterial growth nutrient with a culture of *Propionibacterium shermanii* to form an inoculated medium, said nutrient including lactose, propagating the bacteria while maintaining both the pH of said medium within the range of about 6.8 to 7.0, and the lactose content of said medium within the range of about 0.5 to about 1.5 percent by weight, until the optimum bacterial concentration is obtained and separating a bacteria containing cell paste from said nutrient, whereby a concentrated propionic acid generating bacterial cell paste is provided.

2. The method of preparing a concentrated bacteria containing cell paste comprising, inoculating a bacterial growth nutrient with a culture of *Propionibacterium shermanii* to form an inoculated medium, propagating the bacteria while maintaining said medium at a temperature of about 86 degrees F. and at a pH of about 6.8 to 7.0 for at least about 48 hours, and while maintaining the lactose content of said medium within the range of about 0.5 to about 1.5 percent by weight, and centrifuging said inoculated medium to separate the bacteria containing cell paste from said nutrient, whereby a concentrated propionic acid generating bacterial cell paste is provided.

3. The method of preparing a concentrated propionic acid generating bacterial cell paste comprising inoculating a bacterial growth nutrient containing lactose with a culture of *Propionibacterium shermanii* bacteria to form an inoculated medium, propagating the bacteria while maintaining both the pH of said medium within the range of about 6.8 to about 7.0, and the lactose content of said inoculated medium within the range of about 0.5 to about 1.5, and separating the bacteria from said medium, whereby a concentrated propionic acid generating bacterial cell paste is provided.

References Cited

UNITED STATES PATENTS

| | | | |
|---|---|---|---|
| 2,715,602 | 8/1955 | Hargrove et al. | 195—96 |
| 2,838,443 | 6/1958 | Gillespie | 195—96 |
| 3,159,490 | 12/1964 | Hussong et al. | 99—116 |

ALVIN E. TANENHOLTZ, *Primary Examiner.*